(12) United States Patent
Twomey et al.

(10) Patent No.: US 6,389,986 B1
(45) Date of Patent: May 21, 2002

(54) ADAPTOR FOR CONVERTING BULK SOLIDS CONTAINER FOR FLUID STORAGE/TRANSPORTATION

(75) Inventors: Graham Francis Twomey, Geraldton; Mark Evan Hopkins, Moonyoonooka, both of (AU)

(73) Assignee: Gold Coast Holdings Pty Ltd (AU)

( * ) Notice: Subject to any disclaimer, the term of this patent is extended or adjusted under 35 U.S.C. 154(b) by 0 days.

(21) Appl. No.: 09/743,862

(22) PCT Filed: Jun. 11, 1999

(86) PCT No.: PCT/AU99/00457

§ 371 Date: Jan. 16, 2001

§ 102(e) Date: Jan. 16, 2001

(87) PCT Pub. No.: WO00/03893

PCT Pub. Date: Jan. 27, 2000

(30) Foreign Application Priority Data

Jul. 14, 1998 (AU) .............................. PP4663

(51) Int. Cl.[7] .............................................. B61D 5/00
(52) U.S. Cl. ..................................................... 105/359
(58) Field of Search ................................ 105/355, 359, 105/379, 393, 247, 248

(56) References Cited

U.S. PATENT DOCUMENTS 2,712,797 A * 7/1955 Woehrle et al. ............. 105/367
3,095,206 A * 6/1963 Fresia et al. .................... 280/5
5,402,732 A * 4/1995 Erickson et al. ............ 105/359
5,983,957 A * 11/1999 Erickson ........................ 141/7

FOREIGN PATENT DOCUMENTS

| FR | 2629062 | 9/1989 |
| GB | 2074508 | 11/1981 |
| JP | 2191181 | 7/1990 |
| WO | WO9104928 | 4/1991 |
| WO | WO9521084 | 8/1995 |

* cited by examiner

Primary Examiner—S. Joseph Morano
Assistant Examiner—Robert J. McCarry, Jr.
(74) Attorney, Agent, or Firm—Reising, Ethington, Barnes, Kisselle, Learman & McCulloch, PC

(57) ABSTRACT

A bladder stowage and deployment apparatus particularly for an open topped body used for transport of goods supported from an upper region of said body, to allow fluids to be stored within the bladder while avoiding cross-contamination with the body, the bladder stowage and deployment apparatus having a base member supporting a bladder within the body, the base member movable between and upward stowed position in which the bladder is stowed above and the body can be used for stowage of goods, and a downward deployed position in which the bladder fills available space within the body and holds fluid, and wherein the bladder stowage and deployment apparatus has features to avoid abrading of the bladder such as arrangements to draw in the sides of the bladder.

18 Claims, 8 Drawing Sheets

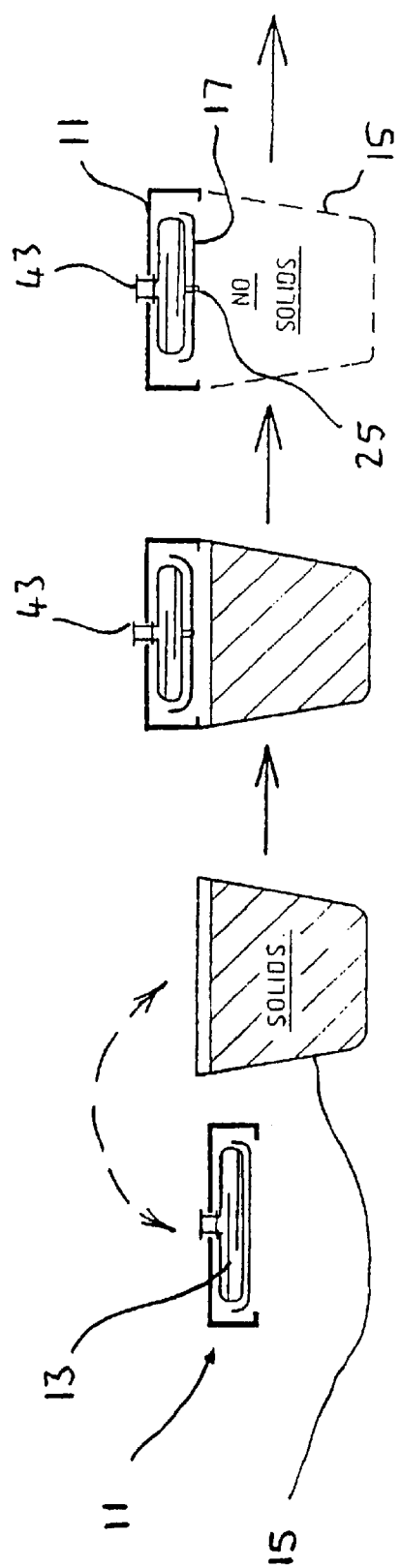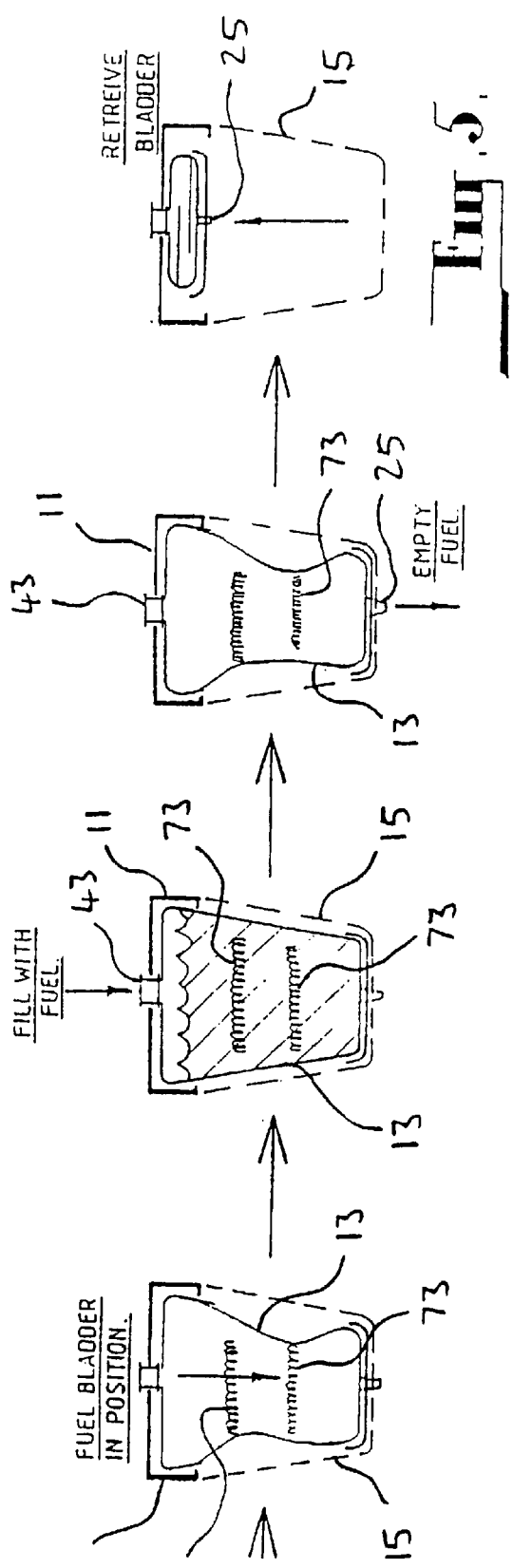
Fig. 5.

ADAPTOR FOR CONVERTING BULK SOLIDS CONTAINER FOR FLUID STORAGE/TRANSPORTATION

FIELD OF THE INVENTION

The present invention relates to the transport and storage of bulk goods, and in particular an apparatus and method for maximising the potential usage of bulk goods transport vehicles and storage facilities.

BACKGROUND ART

Goods transport vehicles for road and rail use are usually purpose built with a particular application in mind. Consequently there are many types of vehicle body employed for road and rail transport usage. In the case of railway wagons/cars, these vehicle bodies include gondolas and hopper cars for the transport of bulk solid goods such as coal, ores, and grain, box cars for the transport of manually handled bulk goods and refrigerated goods, tankers for transport of fluids, and flat cars for transport of container traffic and other items. There are also many other types of specially designed railway wagons.

Railways are often used for the transport of bulk solid goods such as ores and grains, in trains made up of many identical hopper wagons. In the case of ore transport, the ore is often transported in this manner from the mine site or a central stock pile from a number of mine sites, to a refinery or port for processing or shipping, respectively. The train then returns with empty hopper wagons, to be refilled and repeat the journey.

There is often a need for the transport of liquid goods such as fuel and the like to such a mine site. If these liquid goods are transported by rail, this can be accomplished by coupling the appropriate tanker wagons to the train, and transporting the liquid goods along with empty hopper wagons. Similarly, bulk solid goods such as ores are transported out from a mine to a port or processing plant by road in open bodied trucks which then return empty to the mine, and tanker trucks bring liquid goods such as fuels to the mine and return empty therefrom.

DISCLOSURE OF THE INVENTION

This invention has been conceived to enable dual usage of bulk solid goods transport vehicles or storage containers. In the case of bulk solid goods vehicles, the invention allows simple and rapid conversion of a vehicle between being able to transport bulk solids, and being able to transport fluids; while avoiding any problems of cross-contamination between the solid and fluid goods. With such an arrangement the same vehicle can transport solid goods in one trip, and be readily converted to transport liquid goods for the next trip. In the case of road transport, this invention offers the possibility of cutting down the number of goods transport trucks required by up to one half, which could represent a considerable cost saving to transport operators and their customers alike. In the case of rail transport, the invention can also offer a saving, if not to the same extent in fuel usage as by road, at least by cutting down on the number of vehicles required for transport purposes.

The invention may have application in bulk liquid storage and transport containers, to allow transport and storage of more than one type of fluid, without the need for cleaning, and while avoiding cross contamination. The invention will also have application in bulk solids storage containers, for example in silos used on farms.

The invention resides in a bladder stowage and deployment apparatus for a body used for the stowing storage or transport of goods.

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with one aspect of the invention there is provided, in a body used for the stowing, storage, or transport of goods, the body having a base bounded by side(s); a bladder stowage and deployment apparatus supported from an upper region of said body, said bladder stowage and deployment apparatus having a base member adapted to support a bladder within said body, said base member being movable between an upward stowed position in which said bladder is stowed above said body and said body can be used for stowage of goods, and a downward deployed position in which said bladder may substantially fill available space within said body and be used for holding fluid; wherein said base member has dimensions which conform substantially to the internal shape of the body proximal to said base, and wherein said bladder stowage and deployment apparatus includes means to avoid abrading of said bladder against the side(s) of said body.

In accordance with a second aspect of the invention there is provided an adaptor to allow a body used for the stowing, storage, or transport of goods, to hold bulk fluid without cross contamination, the body having a base bounded by side(s), said adaptor comprising a bladder stowage and deployment apparatus supported from an upper region of said body, said bladder stowage and deployment apparatus having a base member adapted to support a bladder within said body, said base member being movable between an upward stowed position in which said bladder is stowed above or in an upper region of said body and said body can be used for stowage of goods, and a downward deployed position in which said bladder may substantially fill available space within said body and be used for holding fluid; wherein said base member has dimensions which conform substantially to the internal shape of the body proximal to said base and wherein, said bladder stowage and deployment apparatus includes an anti-abrasion device or means to avoid abrading of said bladder against the side(s) of said body.

In accordance with a third aspect of the invention there is provided an adaptor to allow an open topped body used for the transport of bulk solid goods, to hold bulk fluid without cross contamination, the body having a base bounded by side(s), said adaptor comprising a bladder stowage and deployment apparatus supported from an upper region of said body, said bladder stowage and deployment apparatus having a base member adapted to support a bladder within said body, said base member being movable between an upward stowed position in which said bladder is stowed above or in an upper region of said body and said body can be used for stowage of goods, and a downward deployed position in which said bladder may substantially fill available space within said body and be used for holding fluid; wherein said base member has dimensions which conform substantially to the internal shape of the body proximal to said base, and wherein said bladder stowage and deployment apparatus includes an anti-abrasion device or means to avoid abrading of said bladder against the side(s) of said body.

It will be appreciated that the term "side(s)" encompasses a cylindrical body having a side wall of circular cross-section, or a square, rectangular, or other polygonal body having a plurality of walls.

The inclusion of the anti-abrasive device avoids the sides of the bladder becoming caught between the base member and the body, and avoids the sides of the bladder being excessively subjected to abrading contact against side(s) of the body and consequently being damaged. In preferred arrangements, said means to avoid abrading also assists in aligning the bladder relative to structural members of said apparatus, which avoids abrading of said bladder in the region of filling and emptying connectors.

Preferably said bladder is secured to said base member, at least toward any connector for emptying, and preferably around or near the periphery of the base member. Securing the bladder to the base member assists in aligning the bladder relative to structural members of said apparatus, which avoids abrading of said bladder in the region of filling and emptying connectors.

In accordance with a preferred feature of any of the preceding aspects of the invention, where the body is an open-topped body (such as a gondola or a hopper used for railway transport), said bladder stowage and deployment apparatus includes a cover assembly fabricated to fit as a lid for the body, said base member and said bladder being supported from said cover assembly.

Preferably said anti-abrasion device of said bladder includes a contraction device to urge side wall(s) of said bladder inwardly. The contraction device operates to draw the side walls of the bladder in, when the base member is moved between the upward stowed position and the downward deployed position, or when the bladder is in the downward deployed position and being emptied.

Alternatively or additionally, preferably said anti-abrasion device includes upward extending side walls extending from the periphery of said base member.

Furthermore, and preferably, said anti-abrasion device of said bladder includes a connector to fix said bladder at or near the periphery of said base member.

Preferably said a connector includes a peripheral skirt or peripheral straps extending at least intermittently from said bladder and attached to said base member. Thus the peripheral skirt may be formed from at least three or four narrow straps arranged to secure the bladder to said base member.

In a further alternative or addition arrangement, preferably said anti-abrasion device includes a friction bearing strip arranged around the periphery of said base member. In this arrangement, preferably said friction bearing strip forms part of said means to secure said bladder to said base member, sandwiching and securing said peripheral skirt or peripheral straps to said base member.

Furthermore, and preferably, said anti-abrasion device of said bladder includes another connector to fix said bladder at or near the periphery of the top of said body, or at or near the periphery of said cover.

Preferably said attaching means includes a second peripheral skirt or a plurality of peripheral straps extending at least intermittently from said bladder and attached to the top of said body or to said cover. Thus the second peripheral skirt may be formed from at least three or four strap loops arranged to secure the bladder to said base member.

In addition to the peripheral strap loops, there are included further strap loops arranged on top of said bladder to avoid the top of said bladder from excessively collapsing downwardly.

The most preferred arrangement of the connectors is where straps or peripheral skirts secure the bladder at its base to the base member, and at its top to the top of the body or cover. In this manner, when the base member is moved from the upward stowed position to the downward deployed position, with the means to urge side wall(s) guiding inward movement of the side walls, the top and bottom of the bladder are maintained in relative spatial alignment, preventing damage which might otherwise occur if the disposition of the bladder is left to chance during this movement.

Preferably said bladder stowage and deployment apparatus includes hoist means to raise and lower said base member.

The base member has a shape which conforms to the internal shape of the body, in order to maximise the available space for storage of fluid in the bladder.

Preferably, the base member has a generally flat base to simplify construction of the bladder.

Preferably said base member includes an aperture therethrough for receiving a drain connection of said bladder.

Preferably said base member is configured (relative to the configuration of said body) to allow a space underneath for the access to said drain connection of the bladder. The filling connection for the bladder may be of conventional form for fluid storage and transport, and located on a top aspect of the bladder.

Preferably said contraction device includes a tensioner attached to opposing or adjacent positions along the side wall(s) on the inside of said bladder to draw in the sides of said bladder (as considered relative to the top and bottom of the bladder) as said base member is moved between said downward deployed position and said upward stowed position, or as said bladder is emptied of fluid.

Preferably said a tensioner includes at least one tension coil spring. Other tensioning devices may be employed such as elastic strapping or other elastic material which is under tension when the bladder is filled or lowered.

Preferably where more than one tension spring is employed, the tension springs are preferably arranged alternately normal to each other.

BRIEF DESCRIPTION OF THE DRAWINGS

Two preferred embodiments of the invention, one being an adaptor to convert for fluid transport an open top hopper railway wagon, and the other being a pair of adaptors to convert for fluid transport an open-topped side tipping trailer for a prime mover, will now be described in the following description, made with reference to the drawings in which:

FIG. 5 is a sequence of views showing operational steps of the adaptor when fitted to the open top hopper railway wagon;

BEST MODE(S) FOR CARRYING OUT THE INVENTION

Figure 1:
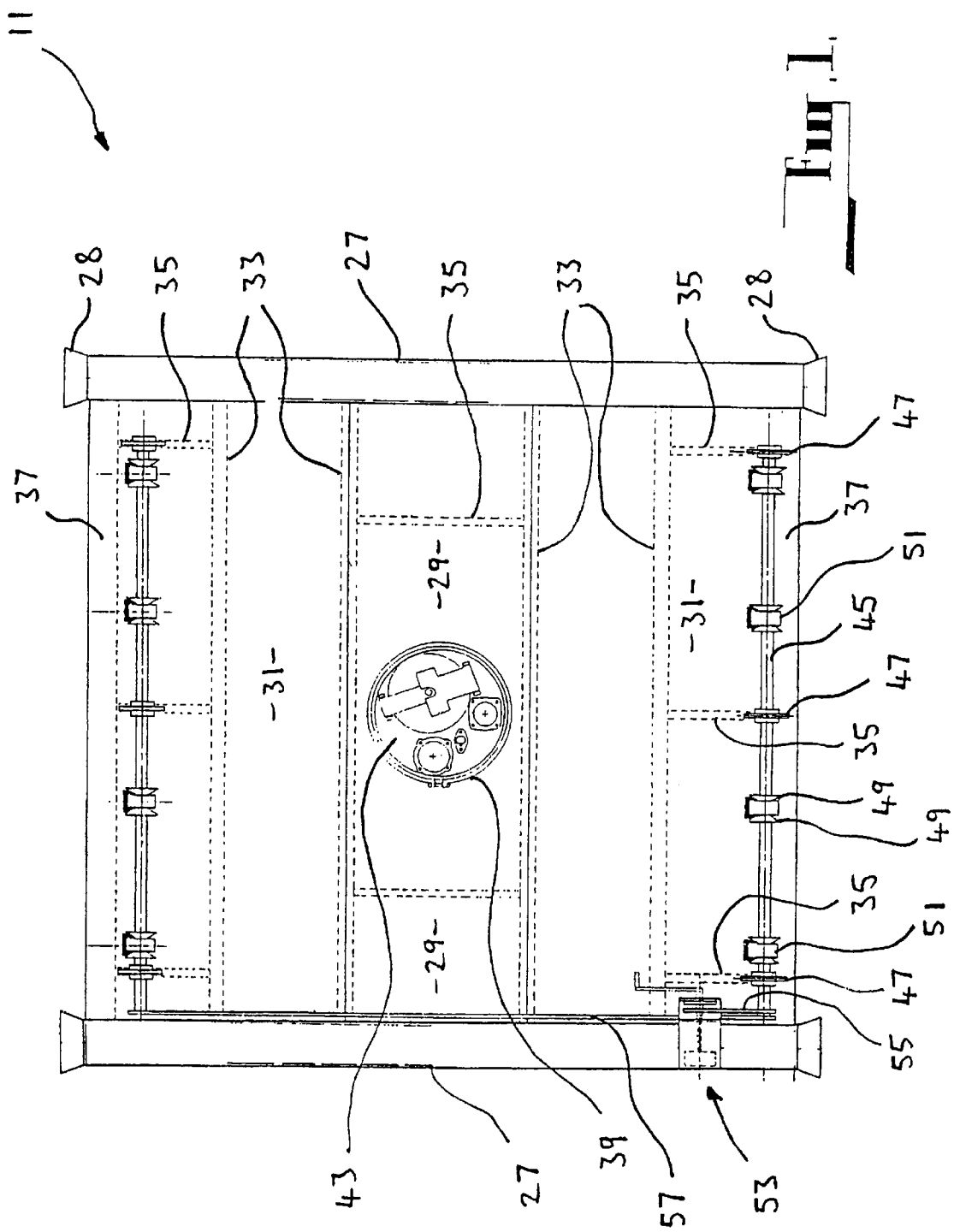
FIG. 1 is a plan elevation from above of the adaptor according to the first embodiment.

The first embodiment is an adaptor to convert an open-top bulk-solids hopper railway wagon for fluid transport, and includes a cover 11 incorporating a fluid storage bladder 13 for an open topped hopper railway wagon (indicated generally in FIG. 5). The cover 11 is configured to fit and be secured to the upper rim of the body of the hopper wagon. The fluid storage bladder 13 is supported on a base member 17 which has a flat bottom 19, and has sides 21 which extend sufficiently high to wholly contain the bladder 13 when it is empty. The base member 17 is of moulded reinforced fibreglass construction. The base member 17 includes an aperture 23 in its bottom 19 through which a fluid drain 25 protrudes. The fluid drain in the embodiment comprises an M-TECT™ dry disconnect coupling, as commonly employed in fluid handling.

The cover 11 has a pair of transverse beams 27 which extend across at either end of the cover 11. The transverse beams 27 are formed of 250×250×5 RHS (all dimensions in mm), and are provided for forklift handling, to enable ready fitting and removal of the adaptor to and from the body of the hopper wagon. The transverse beams include flared end portions 28 to assist in alignment of the forks of a forklift. A C-plate panel 29 provides a walkway along the longitudinal centre of the cover 11. Panels 31 formed of 2 mm zinc plate steel complete the cover.

Figure 2:
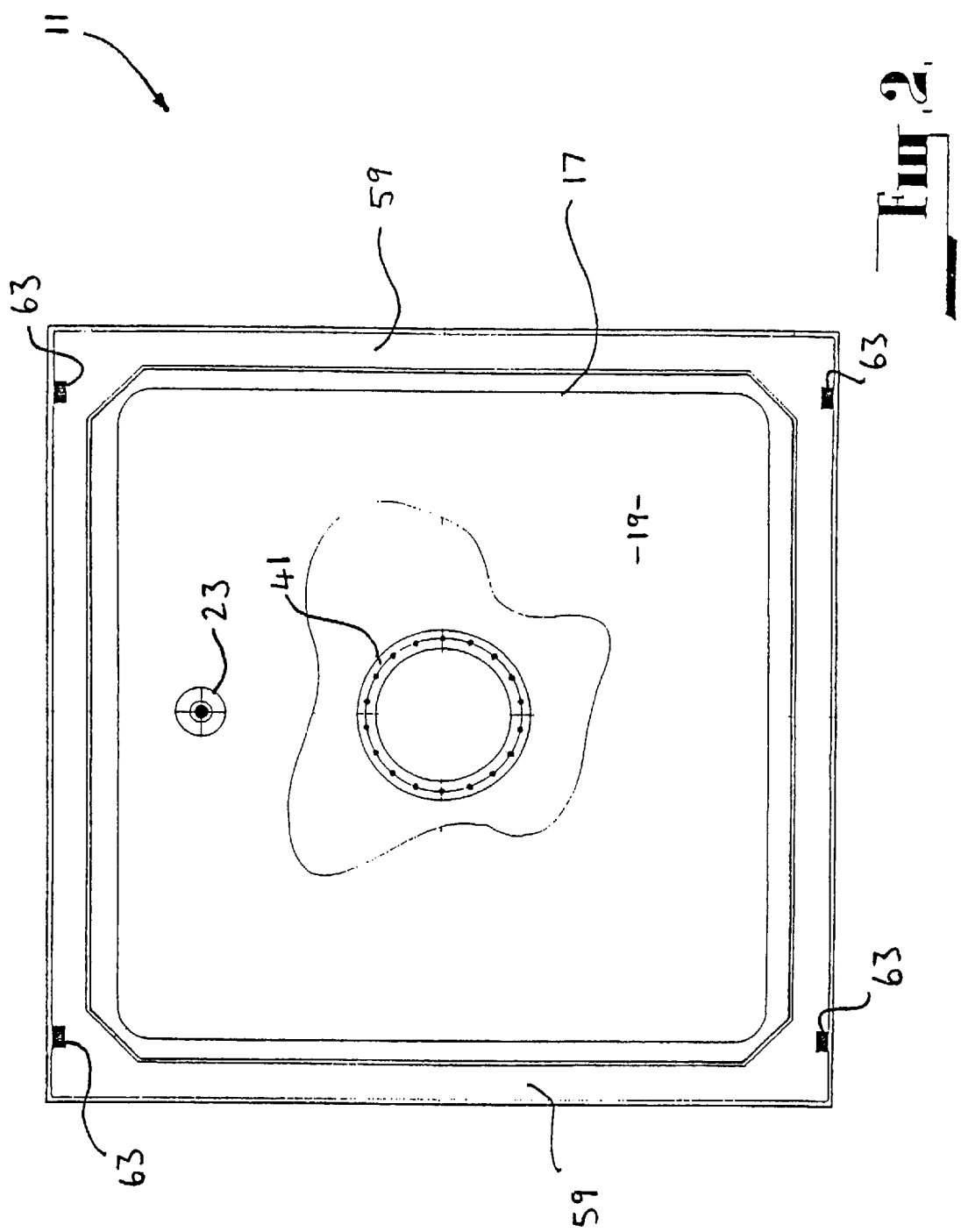
FIG. 2 is a plan and partially segmented view from above of the adaptor according to the first embodiment.

Structural support for the cover 11 is provided by 50×50×3 RHS longitudinal support beams 33 and 50×25×3 RHS transverse support beams 35 (all shown in dotted outline in FIG. 1), the support beams 33 and 35 being located underneath the panels 29 and 31. Two 100×50×3 RHS longitudinal support beams 37 extend along each side of the cover 11, under the panel 31. A circular aperture 39 is located in panel 29, and includes an adaptor fitting 41 (shown in the cut-away part of the drawing of the bladder in FIG. 2) for a VOH-200™ hatch 43, the fittings of which communicate with the interior of the bladder 13, and are used for filling purging and venting purposes.

Hoist means is provided by two longitudinal rotary shafts 45 which are mounted to the support beams 35 (and 37) on bearing assemblies 47. Four pulleys 49 are fixed to each shaft 45, mounted in spaced relation for load bearing purposes. Each pulley 49 includes 50 mm load strapping 51 which extends through apertures in the panels 31 and is attached to the sides 21 of the base member 17. The load strapping 51 is a reinforced polyester webbing (Type 108) having a failure load of approximately 24 kN.

A hand operated hoist 53 is mounted on one of the transverse beams 27, and connected to the adjacent longitudinal rotary shaft 45 by an endless chain 55 (½" BS Conlink Chain Drive). The rotary shafts 45 are joined for synchronised rotation by an endless chain 57 (also a ½" BS Conlink Chain Drive).

Figure 3:
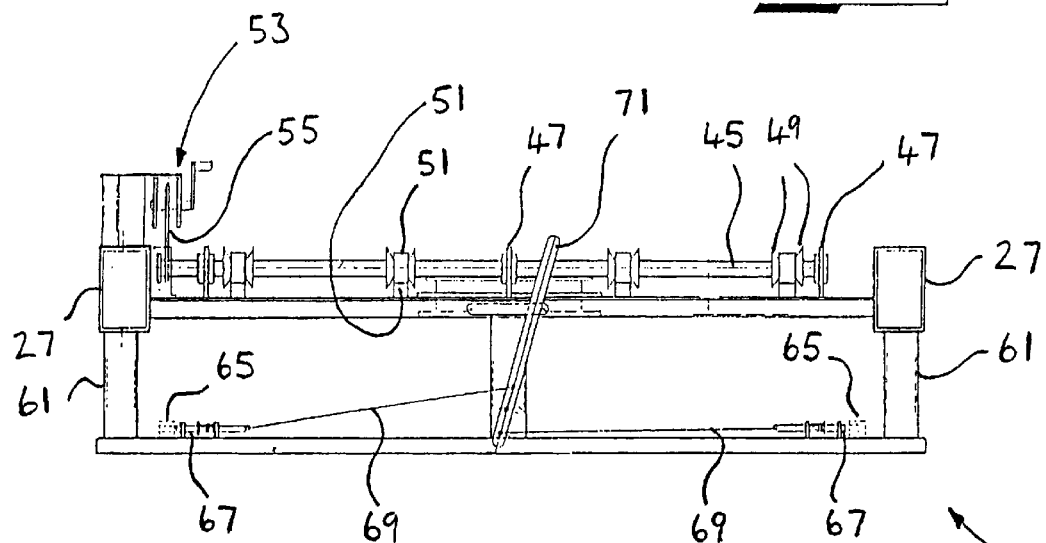
FIG. 3 is a cross-sectional side elevation through the longitudinal extent of the adaptor (adjacent to post positions on the top of the body of the hopper wagon) according to the embodiment.
Figure 4:
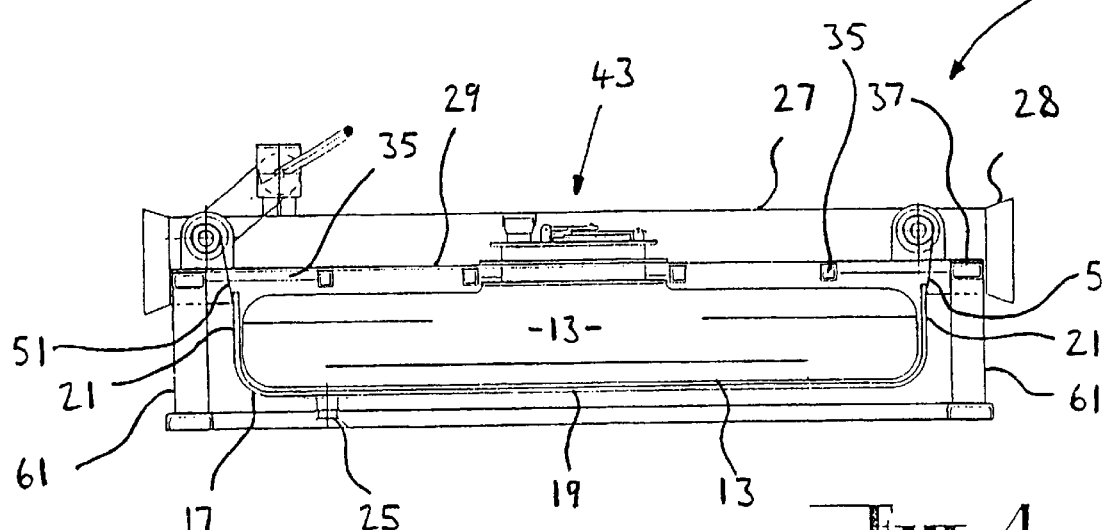
FIG. 4 is a cross-sectional end elevation through the centre of the adaptor.

The cover also includes a frame member 59 formed of pressed steel plate, which is shaped to fit over the lip of the body of a hopper wagon to which the adaptor is intended to be fitted. The frame member 59 is supported from the transverse beams 27 and support beams 37 by eight 100×10×3 RHS stub columns 61 which are covered in non structural zinc plated steel sheet (not shown) to prevent the ingress of dust and any incident foreign bodies. The frame member 59 has four apertures 63, (see FIG. 2) through which posts 65 located on the top of the body of the hopper wagon may protrude. Referring to FIG. 3, the posts 65 include apertures (shown in dotted outline) for receiving spring loaded pins 67, to secure the adaptor against unintended dislodging or removal. The spring loaded pins 67 are connected via cables 69 to a handle 71 which is pivotally mounted to one of the stub columns 61. Operation of the handle can withdraw the pins 67 from the posts 65, allowing removal and replacement of the adaptor from the body of the hopper wagon.

The bladder 13 should be formed of a plastic resistant to the fluid intended to be transported. In the case of the embodiment, the bladder 13 is made of cloth reinforced "XR5 ELVALOY" ethylene interpolymer alloy P.V.C. plastic. The bladder 13 includes contraction means in the form of two internally mounted 30 mm diameter×2 mm (wire thickness) stainless steel tension springs 73 which are joined to the interior of the bladder by strapping welded thereto. The springs 73 are 900 mm in length and may be stretched to 2,800 mm (the actual stretched length will be determined by the normal operational size of the bladder, however care should be taken to ensure the springs are selected so that when under tension their normal operational length is not exceeded). The springs 73 extend normal to each other (when viewed from above), and are located in spaced relation, as can be seen best in FIG. 5. The purpose of the springs 73 is to collapse the bag, by drawing in the sides of the bladder as the hoist means raises the base member 17 to the upward stowed position. This prevents damage being caused to the bladder 13 by fouling against the body 15 of the hopper wagon or against parts of the adaptor itself. Placement of the springs normal to each other results in the bladder being folded inwardly in two different directions which are normal to each other, assisting in compact stowage of the bladder in the stored position.

Referring to FIG. 5, the adaptor is removed from the body 15 of the hopper wagon to allow the body 15 to be filled with bulk solids. The adaptor is then fitted to the body 15 of the hopper wagon for transport of the bulk solids. At the destination, the bulk solids are emptied from the hopper wagon in the usual manner. The hoist means is operated to lower the base member and bladder to the deployed position, whereafter the bladder 13 may be filled with fluid such as fuel. The hopper wagon then transports the fuel in the return journey to the bulk-solids loading point, at which point the load of fuel is emptied. The hoist means is operated to raise the base member and bladder to the stowed position, whereafter the adaptor may be removed from the body of the hopper wagon for loading bulk solids, before the cycle is repeated.

Figure 6:
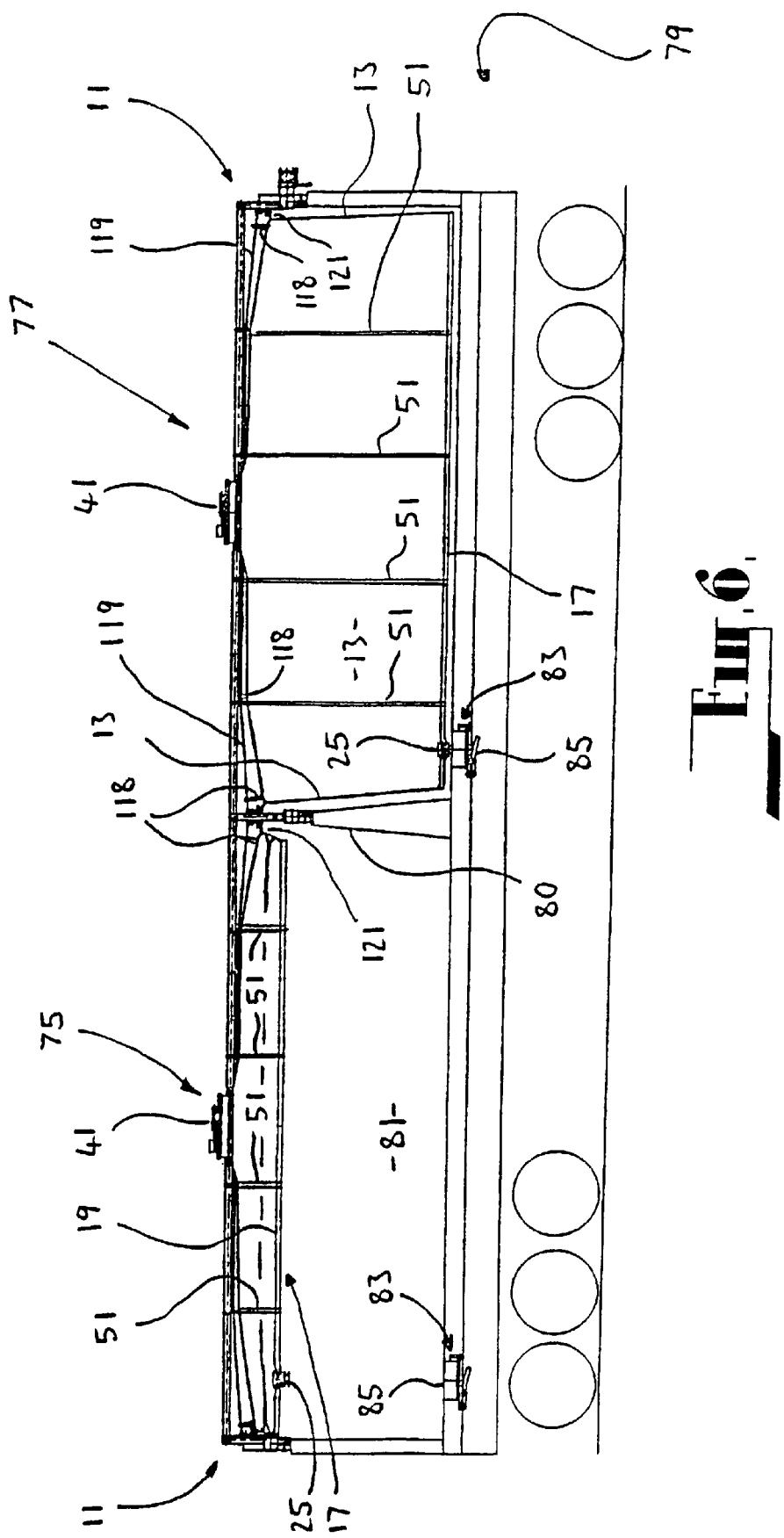
FIG. 6 is a side elevation showing details of the adaptor according to the second embodiment.
Figure 7:
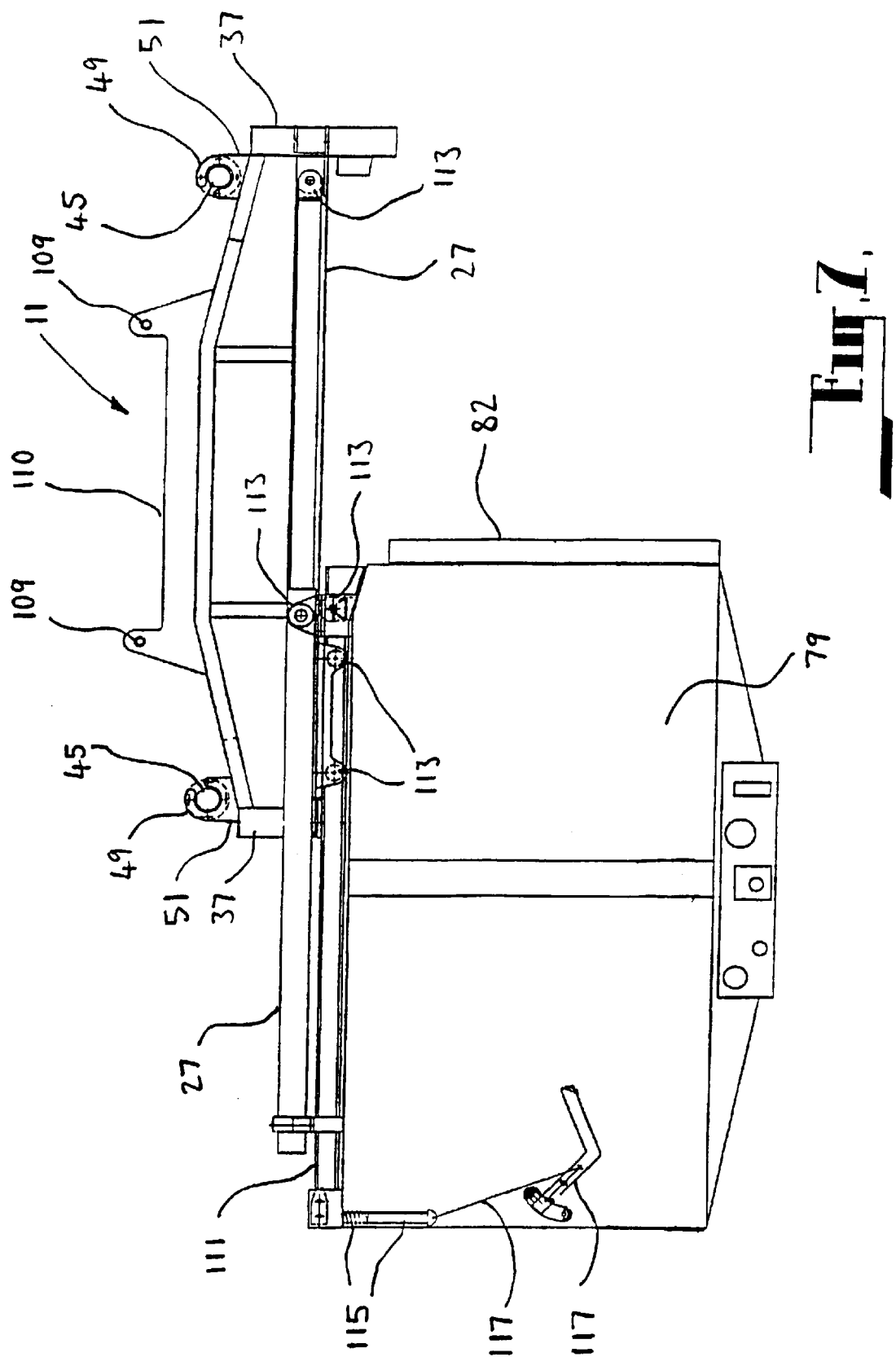
FIG. 7 is an end elevation of the adaptor according to the second embodiment showing an aspect of operation.
Figure 8:
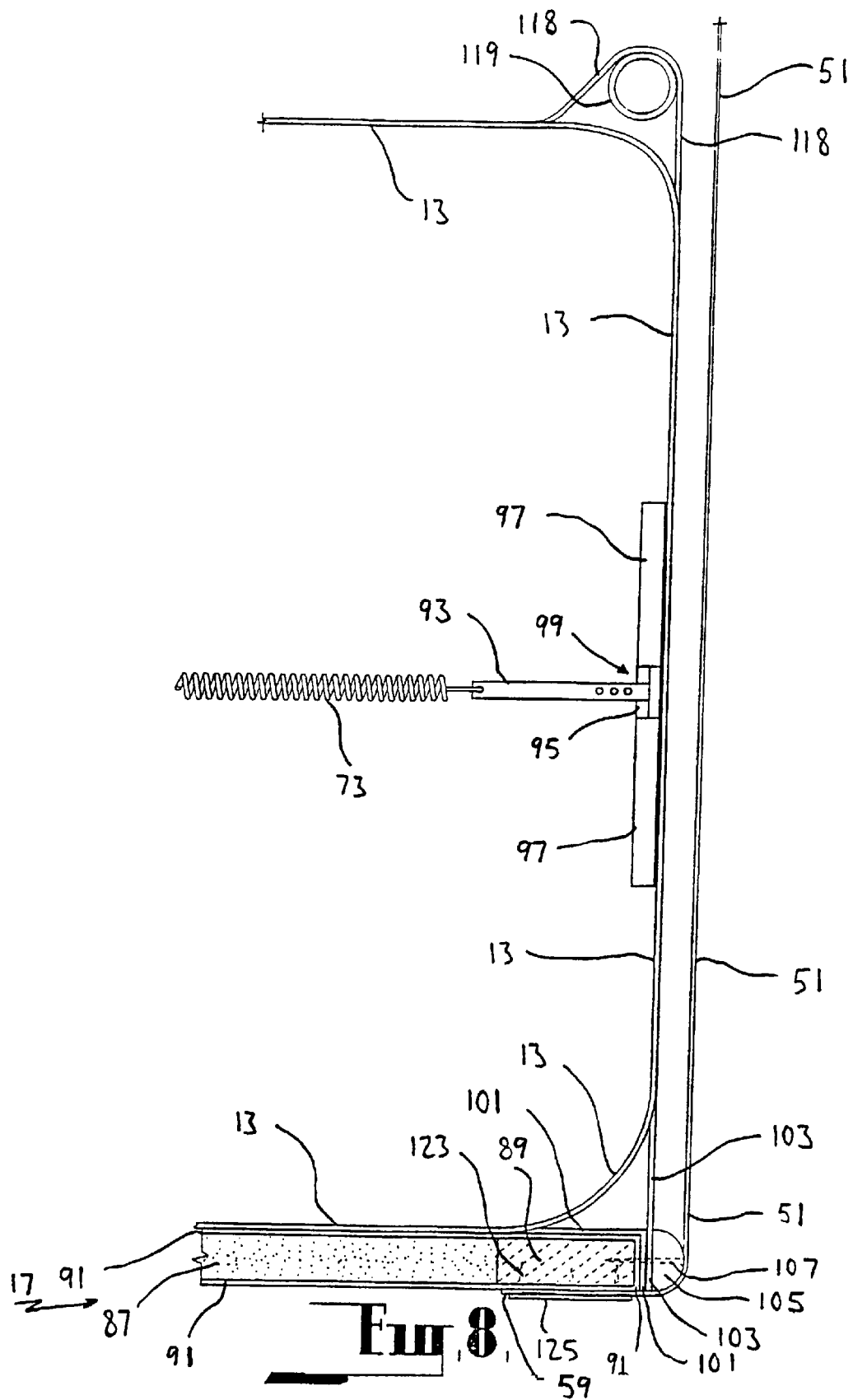
FIG. 8 is a part cross-section view of part of the adaptor according to the second embodiment.

Referring to FIGS. 6 to 8, details of the second embodiment are shown, which is a pair of adaptors 75 and 77 of rectangular cuboid configuration, fitted in a side-tipping trailer 79 for haulage by a prime-mover (not shown). Like reference numerals in the second embodiment denote like parts as described in the first embodiment.

As in the first embodiment, the fitting of the adaptors allows the trailer body 79 to be converted from bulk solids transport (typically run-of-mine ore in one envisaged application) to dual usage where bulk solids may be transported with the adaptors in a raised/upward stowage position, and where liquids such as fuel, oil, or water may be transported with the adaptors in a lowered/downward deployed position. The adaptor 75 is shown in the raised/upward stowage position where bulk solids may be transported in the tipping tray 81, while the adaptor 77 is shown in the lowered/downward deployed position where liquids (or indeed fluids generally) may be transported in the bladder 13 thereof. It should be noted that the adaptors 75 and 77 are both raised and lowered in unison, and are shown with one adaptor 75 raised and the other adaptor 77 lowered, for illustrative purposes, although there is no reason why, in an alternative embodiment, they could not be raised and lowered independently. Tipping tray doors 82, securable to retain the bladders within the tipping body 79, may be opened to allow emptying of bulk solids in known manner.

The trailer body 79 has a central dividing bulkhead 80 and has two apertures 83 in the base thereof with removable covers 85 to retain bulk solids in the trays 81 when the adaptors 75 77 are in the raised/upward stowage position. The covers 85 are removed to gain access to the fluid drain connections 25 of the bladders 13 when the adaptors 75 77 are in the lowered/downward deployed position.

As in the first embodiment, the bladder 13 is supported on a base member 17, construction details for a part of which are shown in FIG. 8. The base member 17 is formed of a core of a sheet of honeycomb reinforcing kevlar embedded in expanded PVC foam 87 or density between 60 kg/m$^3$ and 80 kg/m$^3$ framed by a hardwood timber frame 89 which runs around the periphery of the foam sheet 87, all of which is contained within a shell 91 of fibreglass and resin construction. The density of the foam may vary, depending upon the strength of the reinforcing material.

Figure 9:
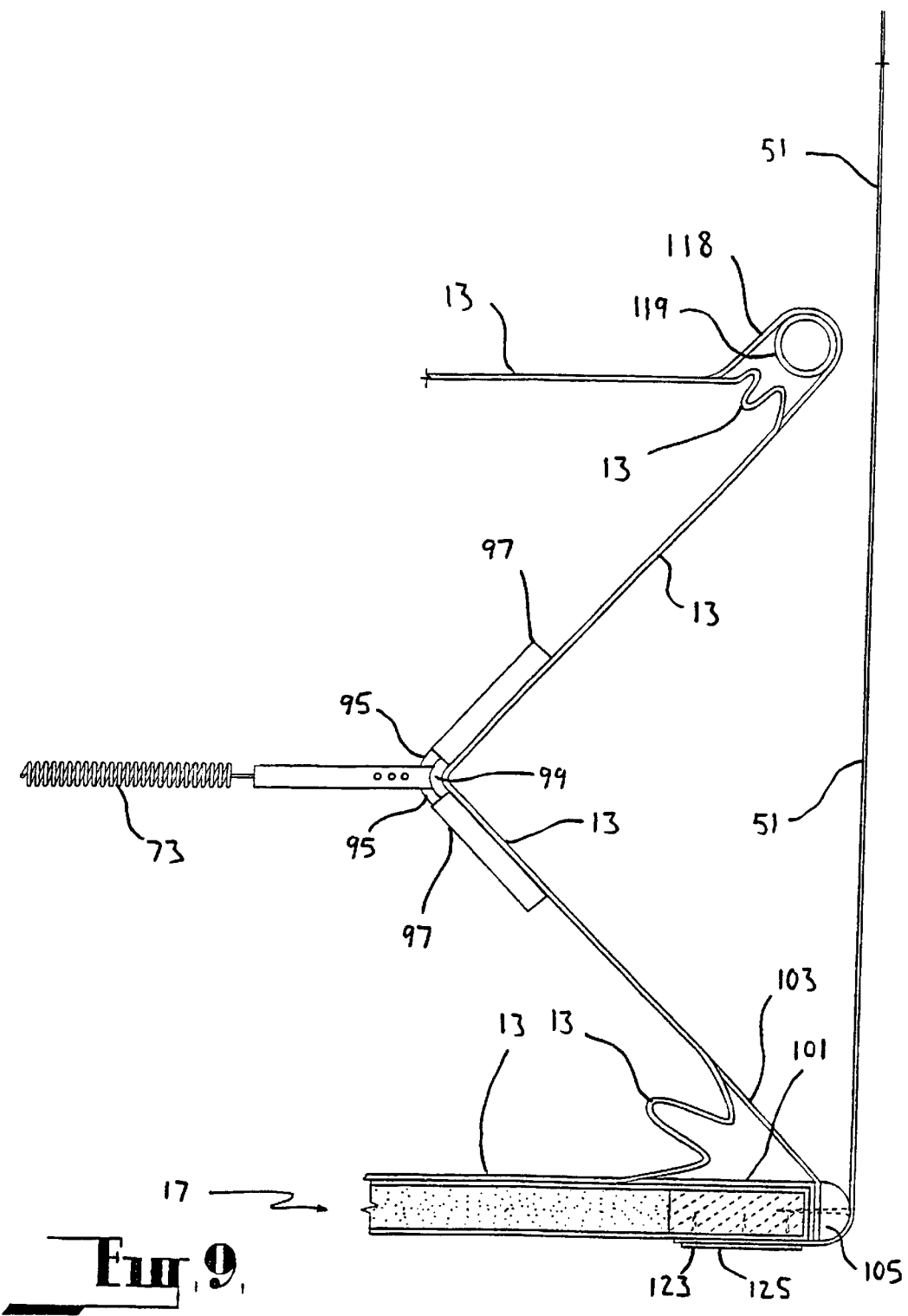
FIG. 9 is a further part cross-section view of the part of the adaptor of FIG. 8 showing the base member between the upward stowed position and the downward deployed position.

A device to urge the side walls of the bladder inwardly is formed by a tensioner having anchor points mid way along the longitudinal sides of the bladders 13. The tensioner comprise four of the springs 73 as described above in the first embodiment, which extend to the opposing longitudinal side of the bladder 13, four of such springs being provided in parallel relationship, per bladder. The springs 73 are mounted at each end to the anchor points via adjustable straps 93. The anchor points are each formed by a reinforced flexible polyvinyl chloride hose 95 which is welded into a vertical loop 97 welded to the inside of the bladder 13. The reinforced flexible polyvinyl chloride hose 95 is accessed by the adjustable straps 93 through a break 99 located along the vertical loop 97, mid way up the sides of the wall of the bladder. The vertical loops 97 are located in spaced apart relation along the longitudinal sides of the bladder to provide a substantially even urging force along the entire longitudinal length of the bladder 13. The loops 97 are formed of the same material as the bladder. While a tensioner of a similar form but extending from opposing ends of the bladder was trialed by the inventor, it was found to be unnecessary; however, in some arrangements, depending upon factors such as the type of bladder material used, and the dimensions, it may prove necessary. Referring to FIGS. 8 and 9, the manner of operation of the tensioning means can be seen.

Additional anti-abrasion provisions to avoid abrading of the bladder 13 are provided in the form of a peripheral outwardly extending skirt 101 welded to the base of the bladder 13, and a "circumferential" downwardly extending skirt 103 welded near the bottom of the sides of the bladder 13. The skirts 101 and 103 are tensioned to hold the bladder 13 relative to the base member 17, and secured thereto by being sandwiched by a high density polyethyene bumper strip 105. The bumper strip 105 is of half-round cross-section, and secured by a number of spaced apart screws 107. The bumper strip 105 forms a peripheral edge of the base member 17, and takes the impact of any contact against the inside of the trailer 79. The skirts 101 and 103 are formed of the same material as the bladder. Securing the bottom of the bladder 13 relative to the base member 17 results in correct registration of the fluid drain 25 with the aperture therefor in the base member 17, and prevents excessive flexing and abrading of the bladder 13 especially in proximity to the fitting 41, which might result if the bladder was not restrained and could move around when it is empty. The bumper strip 105 spaces the bladder material in proximity to the base member 17 away from the inside of the trailer, avoiding contact and abrading of the bladder 13 at this point.

The adaptors 75 also include covers 11 which are constructed in a similar manner to the covers of the first embodiment, with the exception that the transverse beams 27 thereof are not provided to allow the adaptors to be removed by forklift, four hoist lifting points 109 being provided instead for this purpose. The four hoist lifting points are provided in roll-over combing elements 110 which are provided to prevent damage to the adapter fitting in the event of a vehicle roll-over. The other exception in the cover of this embodiment when compared with the first embodiment is that the transverse beams 27 are of telescoping arrangement and include tracks 111 secured to the top of the trailer at each end of each adaptor 75, and roller assemblies 113 to support the transverse beams 27 and tracks 111 to allow the cover 11 to be slid open and closed; open to allow access to the trailer for filling with bulk solids, and closed for transportation. A spring loaded pin 115 at one end of each the tracks 111 secures the transverse beams to retain the cover 11 closed. The spring-loaded pins 115 are operable in unison by a cable and lever assembly 117.

The top of the bladder 13 has a plurality of loops 118 (one of which can be seen in FIGS. 8 and 9) welded to the outside thereof, arranged in four substantially parallel longitudinal lines, extending along the length of the top of the bladder 13. There are six such loops 118 in each line, which receive four longitudinal aluminium tubes 119 (one per line), the tubes being secured to the underside of the cover, to support the top of the bladder 13 and prevent it collapsing downwardly. Two of these tubes are located one along each longitudinal edge of the top, and the other two tubes being spaced evenly from the longitudinal edge of the top and each other. Four loops 121 are provided at each end near the top of the bladder 13 to secure the ends of the bladder 13 against inward collapse. Securing the top of the bladder relative to the cover results in correct registration of the adaptor fitting 41 with the aperture therefor in the cover 11, and prevents excessive flexing and abrading of the bladder 13 in proximity to the fitting 41.

The combination of securing both the top and the bottom of the bladder 13 as described, together with the action of the tensioner as the base member is raised and lowered, ensures that movement of the bladder side walls is controlled, minimising the potential for damage by abrading or pinching.

The base member 17 is raised and lowered with 50 mm load strapping of the same type and arranged and driven in the same manner as in the first embodiment, with the exception that there are four straps 51 along each longitudinal side of the base member 17 (as can be seen in FIG. 6). Each strap 51 is secured to the underside of the base member 17 by three screws 123, reinforced by an aluminium plate 125, the screws 123, and aluminium plate 125 pinning the strap 61 to the underside of the base member 17.

The manner in which the hoisting of the base member is effected to raise and lower it is the same as in the first embodiment, except that due to the load exerted on a hand operated hoist, it is replaced with a hydraulically operated hoist (not shown). Furthermore, clips or shackles can be used to secure the base member to the cover, when in the stowed position, to give added security by taking the load off the straps 51, while the trailer is being towed.

The cycle of operation of use of a bulk goods transport vehicle having the adaptor is the same as that described in the case of the first embodiment with reference to FIG. 5, except to fill the trays 81 of the trailer 79, with the base members 17 in the raised to the upward stowed position, the spring-loaded pins are retracted and covers 11 are rolled along tracks 111 exposing the trays 81 for filling with bulk solids. When the trays 81 are filled, the covers 11 are rolled back to close the tops of the trays, and the bulk solids are transported to their final destination. The covers also serve to obviate the necessity to use tarpaulins to prevent wind dispersal of the load. On arrival at the destination, the load is emptied in the usual manner by side tipping. The base members 17 are then lowered to the deployed position, and the bladders filled with fluid for transport on the return journey. On reaching the destination, the fluid is emptied, and the base members are raised to the stowed position, and the cycle can be repeated.

It should be appreciated that the invention is not limited to the actual embodiments described herein. Changes to certain details such as mechanical particulars of construction of the base member 17, and the cover 11, and other details to achieve the same benefits as discussed in the embodiments, may be made, without departing from the spirit and scope of the invention.

What is claimed is:

1. A bladder stowage and deployment apparatus for a body used for stowage, storage, and transport of goods, to allow fluids to be stored within the bladder while avoiding cross-contamination with the body, the body having a base bounded by side(s), the bladder stowage and deployment apparatus being supported from an upper region of said body, said bladder stowage and deployment apparatus having a base member adapted to support a bladder within said body, said base member being movable between an upward stowed position in which said bladder is stowed above said body and said body can be used for stowage of goods, and a downward deployed position in which said bladder may substantially fill available space within said body and be used for holding fluid; wherein said base member has dimensions which conform substantially to the internal shape of the body proximal to said base, and wherein said bladder stowage and deployment apparatus includes an anti-abrasion device means to avoid abrading of said bladder against the side(s) of said body in the form of a contraction device attached to sides of said bladder to draw in sides of said bladder as said base member is moved toward said upward stowed position.

2. A bladder stowage and deployment apparatus as claimed in claim 1 wherein said bladder is secured to said base member, at least proximal to any connector for emptying.

3. A bladder stowage and deployment apparatus as claimed claim 1 wherein where the body is an open-topped body, said bladder stowage and deployment apparatus includes a cover assembly fabricated to fit as a lid for the body, said base member and said bladder being supported from said cover assembly.

4. A bladder stowage and deployment apparatus as claimed in claim 1 wherein said apparatus also includes upward extending side walls extending from the periphery of said base member.

5. A bladder stowage and deployment apparatus as claimed in claim 1 wherein said apparatus also includes connector to fix said bladder at or near the periphery of said base member.

6. A bladder stowage and deployment apparatus as claimed in claim 5 wherein said connector includes a peripheral skirt or peripheral straps extending at least intermittently from said bladder and attached to said base member.

7. A bladder stowage and deployment apparatus as claimed in claim 1 wherein said apparatus also includes a friction bearing strip arranged around the periphery of said base member.

8. A bladder stowage and deployment apparatus as claimed in claim 7 wherein said friction bearing strip forms part of said connector to secure said bladder to said base member, sandwiching and securing said peripheral skirt or peripheral straps to said base member.

9. A bladder stowage and deployment apparatus as claimed in claim 1 wherein said apparatus also includes another connector to fix said bladder at or near the periphery of the top of said body, or at or near the periphery of said cover.

10. A bladder stowage and deployment apparatus as claimed in claim 9 wherein said other connector includes a second peripheral skirt or a plurality of peripheral straps extending at least intermittently from said bladder and attached to the top of said body or to said cover.

11. A bladder stowage and deployment apparatus as claimed in claim 10 wherein there are included further strap loops arranged on top of said bladder to secure said bladder and avoid the top of said bladder from collapsing downward excessively.

12. A bladder stowage and deployment apparatus as claimed in claim 1 including hoist means to raise and lower said base member.

13. A bladder stowage and deployment apparatus as claimed in claim 1 wherein said base member has a generally flat base.

14. A bladder stowage and deployment apparatus as claimed in claim 1 wherein said base member includes an aperture therethrough for receiving a drain connection of said bladder.

15. A bladder stowage and deployment apparatus as claimed in claim 1 wherein said contraction device includes a tensioner attached to opposing positions along the side wall(s) on the inside of said bladder to draw in the sides of said bladder as said base member is moved between said downward deployed position and said upward stowed position, or as said bladder is emptied of fluid.

16. A bladder stowage and deployment apparatus as claimed in claim 15 wherein said tensioning means includes at least one tension coil spring.

17. A bladder stowage and deployment apparatus as claimed in claim 1 wherein said contraction device includes a tensioner attached to adjacent positions along the side wall(s) on the inside of said bladder to draw in the sides of said bladder as said base member is moved between said downward deployed position and said upward stowed position, or as said bladder is emptied of fluid.

18. A bladder stowage and deployment apparatus as claimed in claim 17 wherein said tensioner includes at least one tension coil spring.

* * * * *

UNITED STATES PATENT AND TRADEMARK OFFICE
CERTIFICATE OF CORRECTION

PATENT NO. : 6,389,986 B1
DATED : May 21, 2002
INVENTOR(S) : Graham F. Twomey et al.

It is certified that error appears in the above-identified patent and that said Letters Patent is hereby corrected as shown below:

Column 1,
Line 14, after "usually" delete "purpose" and insert therein -- purposely --
Line 15, after "vehicle" delete "body" and insert therein -- bodies --

Column 3,
Line 6, after "arrangements" delete "said means to avoid abrading" and insert therein -- anti-abrasion device --
Line 28, after "side" delete "walls" and insert therein -- wall(s) --
Line 38, after "said" delete "a"
Line 43, after "alternative or" delete "addition" and insert therein -- additional --
Line 47, after "part of said" delete "means" and insert therein -- connector --

Column 4,
Line 32, after "preferably said" delete "a"
Line 50, after "plan" insert therein -- elevation --

Column 5,
Lines 65-66, delete "100x10x3" and insert therein -- 100x100x3 --

Column 7,
Lines 15 and 17, delete "75 77" and insert -- 75, 77 --
Line 32, delete "comprise" and insert -- comprises --

Column 9,
Line 49, after "device" delete "means"
Line 59, after "wherein" delete "where"

UNITED STATES PATENT AND TRADEMARK OFFICE
CERTIFICATE OF CORRECTION

PATENT NO. : 6,389,986 B1
DATED : May 21, 2002
INVENTOR(S) : Graham F. Twomey et al.

It is certified that error appears in the above-identified patent and that said Letters Patent is hereby corrected as shown below:

<u>Column 10,</u>
Line 2, after "includes" insert -- a --

Signed and Sealed this

Twenty-fifth Day of March, 2003

JAMES E. ROGAN
*Director of the United States Patent and Trademark Office*